United States Patent
Itou

(10) Patent No.: US 8,110,939 B2
(45) Date of Patent: Feb. 7, 2012

(54) ENGINE STARTING APPARATUS

(75) Inventor: Akito Itou, Kariya (JP)

(73) Assignee: Denso Corporation, Kariya (JP)

(*) Notice: Subject to any disclaimer, the term of this patent is extended or adjusted under 35 U.S.C. 154(b) by 301 days.

(21) Appl. No.: 12/576,335

(22) Filed: Oct. 9, 2009

(65) Prior Publication Data

US 2010/0090526 A1    Apr. 15, 2010

(30) Foreign Application Priority Data

Oct. 10, 2008    (JP) ................................ 2008-264516

(51) Int. Cl.
*B60L 1/00* (2006.01)
(52) U.S. Cl. ........................................ 307/10.6; 307/9.1
(58) Field of Classification Search .................... 307/9.1, 307/10.6; 361/166
See application file for complete search history.

(56) References Cited

U.S. PATENT DOCUMENTS

| | | | | |
|---|---|---|---|---|
| 3,745,362 A | * | 7/1973 | Ballou | ........................ 307/10.6 |
| 6,360,707 B1 | | 3/2002 | Boegner | |
| 2001/0047785 A1 | | 12/2001 | Osada et al. | |
| 2002/0140291 A1 | | 10/2002 | Osada et al. | |
| 2010/0059007 A1 | * | 3/2010 | Senda et al. | ............... 123/179.4 |
| 2010/0116236 A1 | * | 5/2010 | Yamaguchi et al. | ....... 123/179.4 |
| 2011/0196570 A1 | * | 8/2011 | Nakamura | ....................... 701/29 |

FOREIGN PATENT DOCUMENTS

| | | |
|---|---|---|
| JP | 11-030139 | 2/1999 |
| JP | 2000-097139 | 4/2000 |
| JP | 2001-508855 | 7/2001 |
| JP | 2001-317439 | 11/2001 |
| JP | 2002-303230 | 10/2002 |

* cited by examiner

*Primary Examiner* — Fritz M Fleming
(74) *Attorney, Agent, or Firm* — Nixon & Vanderhye PC

(57) ABSTRACT

The engine starting apparatus operates on battery voltage when the battery voltage is higher than a predetermined voltage to control starting of an engine of a vehicle. The engine starting apparatus includes a relay control section configured to output a drive signal individually to first and second relays of a starter of the vehicle engine to drive the first and second relays when predetermined engine start conditions are satisfied, the starter being configured to operate when the first and second relays are driven, and an inter-relay switch configured to make electrical connection between the first and second relays when the first relay is applied with the battery voltage, the second relay being applied with the battery voltage when the electrical connection is made. The first relay is configured to be applied with the battery voltage when a manual start switch is operated.

14 Claims, 7 Drawing Sheets

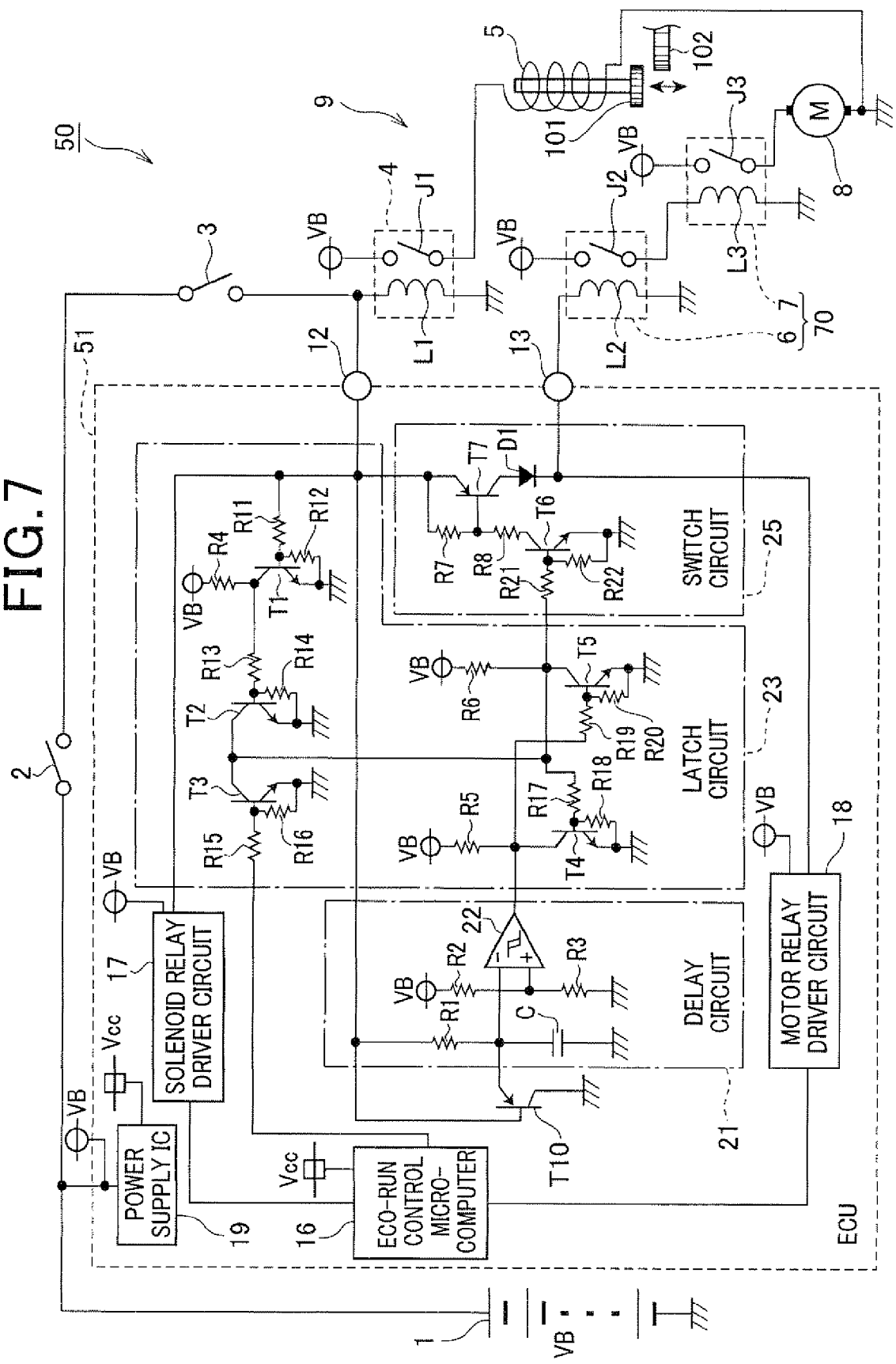

ENGINE STARTING APPARATUS

CROSS-REFERENCE TO RELATED APPLICATION

This application is related to Japanese Patent Application No. 2008-264516 filed on Oct. 10, 2008, the contents of which are hereby incorporated by reference.

BACKGROUND OF THE INVENTION

1. Field of the Invention

The present invention relates to an apparatus mounted on a vehicle for starting an engine mounted on the vehicle.

2. Description of Related Art

In recent years, there has been developed and put to practical use a so-called idle stop system which automatically stops an engine of a vehicle when the engine is not needed to run, for example, while the vehicle stops at a red light, and automatically restarts the engine when the engine becomes needed to run, in view of reduction of fuel consumption and discharged exhaust gas.

The vehicle provided with such an idle stop system is strongly required that the starter thereof is sufficiently quiet and durable, because its engine stops and restarts at frequent intervals. To address this requirement, there is proposed a technique in which a pinion-engagement controlling solenoid which operates to make engagement between a pinion of the starter and a ring gear of the engine is configured to be individually controllable by an ECU (electronic control unit), and the pinion is engaged with the ring gear while the engine is stopped in order to reduce shock at the time when the engagement is made. For more details, refer to Japanese Patent Application Laid-open No. 2001-317439, or Japanese Patent Application Laid-open No. 11-30139.

In this technique, a solenoid relay for operating the pinion-engagement controlling solenoid and a motor relay for operating a starter motor are individually controlled by the ECU. During idle stop, the ECU energizes the solenoid relay so that the pinion-engagement controlling solenoid operates to engage the pinion with the ring gear, and thereafter, when engine starting conditions are satisfied, energizes the motor relay to operate the starter motor to restart the engine. According to this technique, since timings to drive the relays of the starter can be controlled individually and minutely by the ECU, quietness and durability of the starter can be improved.

Meanwhile, when the starter motor is started, since a large current flows through the starter motor because the starter motor has to generate large torque to rotate the crankshaft of the engine, the voltage of a vehicle battery drops.

Usually, when the engine is restarted after idle stop, lubricating oil of the engine is warm enough because the engine was running immediately before the idle stop. Accordingly, since the power which the starter motor needs to restart the engine is comparatively small, and accordingly, the battery voltage does not drop so much. Ordinarily, the battery voltage of 12 V does not drop below 6 V.

However, when the engine is started not after idle stop, but after the vehicle has been parked (referred to as "normal engine start" hereinafter), since the lubricating oil of the engine is cold, the starter motor is required to generate torque to rotate the engine which is larger when the lubricating oil is warm. Accordingly, in this case, the battery voltage may drop as low as 3.5 V, for example.

Generally, the ECU includes a power supply circuit which generates a control-use voltage at a constant level (5V, for example) from the battery voltage. A microcomputer included in the ECU to perform various controls of the idle stop system including controls of the pinion-engagement controlling solenoid and the starter motor operates on this control-use voltage.

The power supply circuit can stably generate the control-use voltage of 5 V unless the battery voltage of 12 V drops below a lower limit of its operation-guaranteed voltage range (6 V, for example). However, if the battery voltage drops below the lower limit, the control-use voltage generated by the power supply circuit becomes lower than 5 V. For example, if the battery voltage drops to 4.5 V and below, the control-use voltage generated by the power supply circuit is lowered to 3.9 V and below.

Accordingly, the microcomputer is configured to be reset when the battery voltage becomes low voltage (4.5 V for example), and consequently the control-use voltage falls below a predetermined voltage (3.9 V, for example), in order to prevent malfunction from occurring due to the fall of the control-use voltage.

Hence, there has been a risk that if the battery voltage drops excessively during normal engine start operation, the control-use voltage is lowered excessively, causing the microcomputer to be reset, and accordingly causing each relay of the starter to be uncontrollable. As explained above, the techniques disclosed in the above patent documents in which the microcomputer included in the ECU individually controls the solenoid relay and the motor relay have the risk that the microcomputer is reset causing it to be unable to control these relays and accordingly causing it unable to start the engine, if the battery voltage drops excessively during the normal engine start operation.

Incidentally, as a measure to prevent the microcomputer from being reset when the battery voltage drops excessively causing the control-use voltage to be lowered excessively, it is known to provide a voltage step-up circuit for stepping the battery voltage in the ECU. However, providing such a voltage step-up circuit increases manufacturing costs.

SUMMARY OF THE INVENTION

The present invention provides an engine starting apparatus which operates on battery voltage when the battery voltage is higher than a predetermined voltage to control starting of an engine of a vehicle, comprising:

a relay control section configured to output a drive signal individually to first and second relays of a starter of the vehicle engine to drive the first and second relays when predetermined engine start conditions are satisfied, the starter being configured to operate when the first and second relays are driven; and an inter-relay switch configured to make electrical connection between the first and second relays when the first relay is applied with the battery voltage, the second relay being applied with the battery voltage when the electrical connection is made;

the first relay being configured to be applied with the battery voltage when a manual start switch is operated.

According to the present invention, there is provided at low cost an engine starting apparatus capable of starting a vehicle engine even when its control means such as a microcomputer which operates on battery voltage supplied from a vehicle battery is disabled from operating due to drop of the battery voltage.

Other advantages and features of the invention will become apparent from the following description including the drawings and claims.

BRIEF DESCRIPTION OF THE DRAWINGS

In the accompanying drawings:

FIG. 7 is a block diagram schematically showing the structure of a modification of the engine starting apparatus according to the first embodiment of the invention.

PREFERRED EMBODIMENTS OF THE INVENTION

First Embodiment

Figure 1:
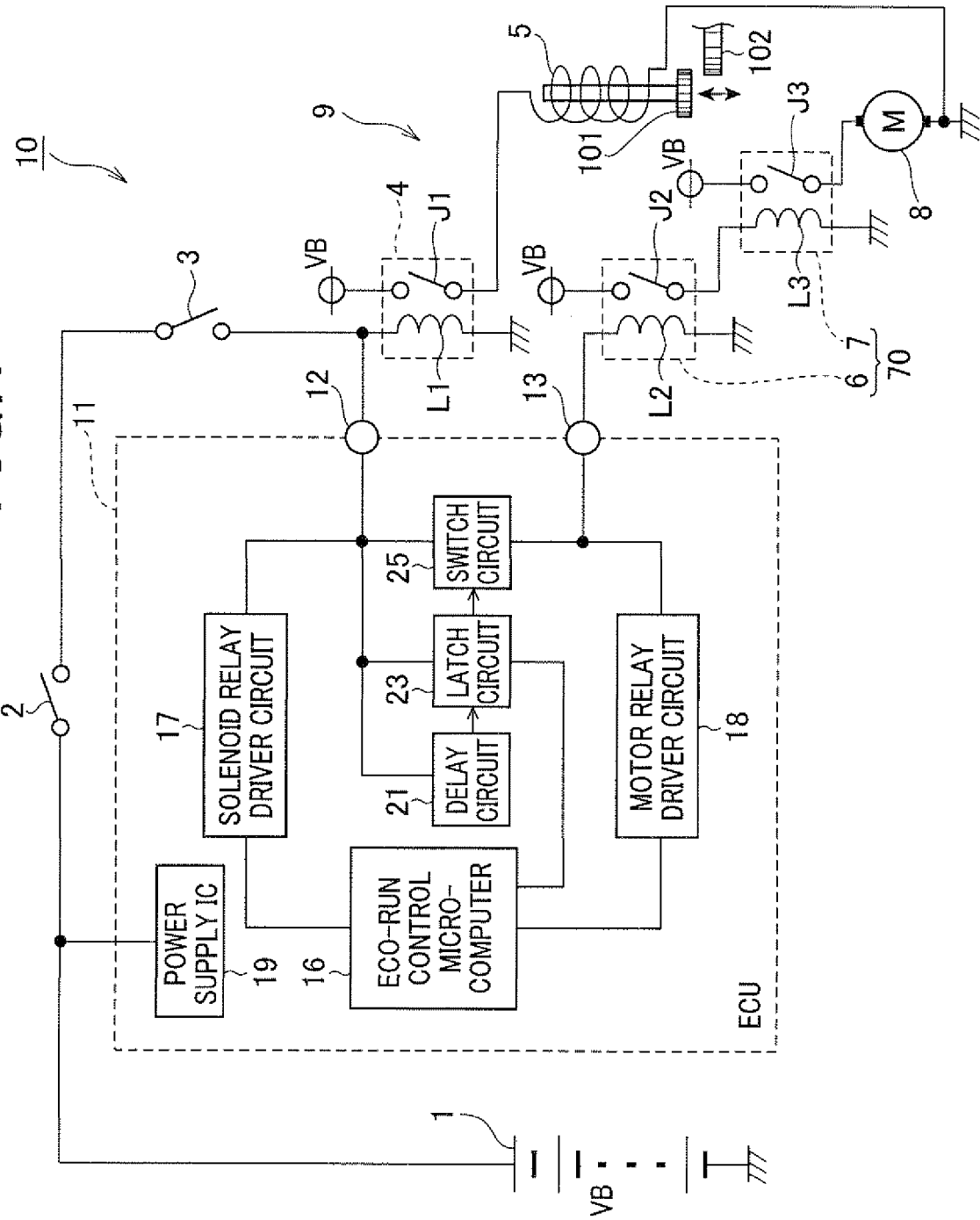
FIG. 1 is a block diagram schematically showing the structure of an engine starting apparatus according to a first embodiment of the invention.

FIG. 1 is a block diagram schematically showing the structure of an engine starting apparatus 10 according to a first embodiment of the invention. The engine starting apparatus 10, which is mounted on a vehicle to control starting of a vehicle engine, includes a battery 1, a starter 9 which operates on electric power supplied from the battery 1, and an ECU 11 for controlling the operation of the starter 9.

The battery 1 is mounted on the vehicle for supplying electric power to various components in the vehicle including the starter 9 and the ECU 11. In this embodiment, the rated terminal voltage of the battery 1 (referred to as the battery voltage VB hereinafter) is 12 V.

The starter 9 includes a pinion 101, a pinion-engagement controlling solenoid 5, a solenoid relay 4, a starter motor 8, a first motor relay 7 and a second motor relay 6. The pinion 101 is configured to engage with a ring gear 102 formed in the outer periphery of a flywheel disposed at an end of a crankshaft (not shown) of the engine to drive the ring gear 102 and accordingly the crankshaft. The pinion-engagement controlling solenoid 5 operates on the battery voltage VB to linearly move the pinion 101 to thereby control the engagement between the pinion 101 and the ring gear 102. The solenoid relay 4 applies the battery voltage VB to the pinion-engagement controlling solenoid 5 when turned on. The starter motor 8 drives the pinion 101 to rotate when applied with the battery voltage VB.

The first motor relay 7 applies the battery voltage VB to the starter motor 8 when turned on. The second motor rely 6 drives (turns on) the first motor relay 7 when turned on.

The solenoid relay 4 includes a relay coil L1 and a relay contact J1. On end of the relay coil L1 is grounded at one end thereof. The other end (may be referred to as "input side end" hereinafter) of the relay coil L1 is connected to a solenoid relay driving terminal 12 of the ECU 11 and also to the positive terminal of the battery 1 through a neutral switch 3 and a key switch 2 (to be explained later). The relay contact J1 is a normally-on contact as well as later explained relay contacts J2 and J3 which are closed when the relay coil L1 is energized. One end of the relay contact J1 is connected to the positive terminal of the battery 1, and the other end is connected to the pinion-engagement controlling solenoid 5.

The first motor relay 7 includes a relay coil L3 and a relay contact J3. One end of the relay coil L3 is grounded, and the other end (input side end) is connected to one end of the relay contact J2 of the second motor relay 6. One end of the relay contact J3 is connected to the positive terminal of the battery 1, and the other end is connected to the starter motor 8.

The second motor relay 6 includes a relay coil L2 and the relay contact J2. One end of the relay coil L2 is grounded, and the other end (input side end) is connected to a motor relay driving terminal 13. The one end of the relay contact J2 is connected to the input side of the first motor relay 7, and the other end is connected to the positive terminal of the battery 1.

The reason why the starter motor 8 is driven through the two relays, the first motor relay 7 and the second motor relay 6 is that the operating current of the starter motor 8 is very large.

In this embodiment, the operating current of the starter motor 8 is of the order of several hundred amperes. To drive a relay whose relay contact allows such a large current to flow therethrough, it is necessary to pass a current of the order of several amperes (5 A to 6 A, for example) to its relay coil. However, the ECU 11 is not able to supply a current as large as several amperes directly to the relay coil.

Accordingly, in this embodiment, the first motor relay 7 directly connected to the starter motor 8 is connected with the second motor relay 6, so that the starter motor 8 can be driven through the first motor relay 7 by driving the second motor relay 6 by the ECU 11. The second motor relay 6 is for passing a current of the order of several amperes to the relay coil L3 of the first motor relay 7. The value of a current necessary to close the relay contact J2 of the second motor relay 6 can be as small as several hundred milliamperes. Accordingly, the second motor relay 6 can be driven directly by the ECU 11.

However, if there is available a relay which can turning on and off a large current of several hundred amperes in accordance a signal from the ECU 11, it may be used instead of the first and second motor relays 6 and 7. Accordingly, in the following description, the first and second motor relays 6 and 7 may be collectively referred to as a motor relay 70.

The ECU 11 is an electronic control unit which performs various controls to implement mainly an idle stop function to temporarily stop the engine when predetermined engine stop conditions are satisfied, and thereafter restarts the engine when predetermined engine start conditions are satisfied. The ECU 11 includes a power supply IC 19, an eco-run control microcomputer 16, a solenoid relay driver circuit 17 and a motor relay driver circuit 18. The power supply IC generates a control-use voltage Vcc (5 V in this embodiment) from the battery voltage VB. The eco-run control microcomputer 16 controls all the operations performed by the ECU 11. The solenoid relay driver circuit 17 outputs a drive signal from the solenoid relay driving terminal 12 to the solenoid relay 4 in accordance with a control command received from the eco-run control microcomputer 16. The motor relay driver circuit 18 outputs a drive signal from the motor relay driving terminal 13 to the motor relay 70 (the second motor relay 6) in accordance with a control command received from the eco-run control microcomputer 16.

The power supply IC 19 generates the control-use voltage of 5 V from the battery voltage VB as long as the battery voltage VB is above or equal to its operation-guaranteed lower limit voltage (6 V in this embodiment). On the other hand, if the battery voltage VB falls below the operation-guaranteed lower limit voltage, the control-use voltage Vcc generated by the power supply IC 19 decreases from 5 V with the decrease of the battery voltage VB. The power supply IC 19 is able to generate a voltage usable as the control-use voltage Vcc until the battery voltage VB decreases below 4V. However, the battery voltage VB has to be higher or equal to 6 V for the power supply IC 19 to generate the control-use voltage of 5 V.

The battery voltage VB supplied to the ECU 11 is applied not only to the power supply IC 19, but also to other circuit components in the ECU 11 which operate on the battery voltage VB. As explained later, the ECU 11 is supplied with the battery voltage VB also from the solenoid relay driving terminal 12 through the key switch 2 and the neutral switch 3. In the following descriptions, the battery voltage VB supplied to the ECU 11 directly from the battery 1 may be referred to as "the battery voltage VE as power source", and the battery voltage VB supplied to the ECU 11 through the key switch 2 and the neutral switch 3 may be referred to as "the battery voltage VB as input signal".

The coo-run control microcomputer 16 operates on the control-use voltage Vcc generated by the power supply IC 19, and is configured to be reset if the control-use voltage Vcc falls below or equal to a predetermined reset voltage (3.9 V in this embodiment). As described above, as the battery voltage VB decreases lower than 6 V, the control-use voltage Vcc generated by the power supply IC 19 decreases, and if the battery voltage VP decreases to 4.5 V, the control-use voltage Vcc generated by the power supply IC 19 becomes 3.9 V. As a result, the coo-run control microcomputer 16 is reset. As explained above, the coo-run control microcomputer 16 operates normally when the battery voltage VB supplied is higher than 4.5 V (that is, when the control-use voltage Vcc is higher than 3.9 V).

The eco-run control microcomputer 16 drives the solenoid relay 4 and the motor relay 70 respectively through the solenoid relay driver circuit 17 and the motor relay driver circuit 18 to cause the starter 9 to operate.

However, it should be noticed that the starter 9 is driven by the eco-run control microcomputer 16 only when the engine is restarted after being temporarily stopped by the idle stop function, and accordingly the starter 9 is not driven by the eco-run control microcomputer 16 when the engine is started up through the normal engine start operation. The driving of the starter 9 by the normal engine start operation is explained later.

Here, the idle stop function implemented by the eco-run control microcomputer 16 is schematically explained. The eco-run control microcomputer 16 judges whether or not predetermined engine stop conditions have been satisfied after the engine has been started by the starter 9 which was driven in accordance with the normal engine start operation. For example, the engine stop conditions include that the vehicle speed is 0, that the gear of a not shown transmission of the vehicle is in a predetermined range (for example, in the neutral range in the case of manual transmission, and in the neutral or parking range in the case of automatic transmission), and that brake is being applied.

Upon judging that the engine stop conditions have been satisfied, the eco-run control microcomputer 16 performs a predetermined operation to temporarily stop the engine.

Thereafter, the eco-run control microcomputer 16 judges whether or not predetermined engine restart conditions to restart the engine. For example, the engine restart conditions include that the brake has been released, that the clutch of the vehicle has been stepped on in the case of manual transmission, and the gear of the transmission has been shifted to the drive range in the case of automatic transmission.

Upon judging that the engine restart conditions have been satisfied, the eco-run control microcomputer 16 outputs the control command to the solenoid relay driver circuit 17 to cause the solenoid relay driver circuit 17 to output the drive signal.

The solenoid relay driver circuit 17 applies the battery voltage VB supplied to the ECU 11 to the solenoid relay driving terminal 12 as the drive signal in response to the control command received from the eco-run control microcomputer 16. The solenoid relay driver circuit 17 may be constituted of a switching circuit configured to turn on when applied with the control command to output the drive signal (battery voltage VB) therethrough.

The drive signal outputted from the solenoid relay driver circuit 17 is applied to the solenoid relay 4 by way of the solenoid relay driving terminal 12. In short, the battery voltage VB is applied to the relay coil L1 of the solenoid relay 4 to turn on the solenoid relay 4. As a consequence, the pinion-engagement controlling solenoid 5 is applied with the battery voltage VB, and accordingly the pinion 101 is moved to engage with the ring gear 102. Incidentally, at this time, there may occur a case where the pinion 101 does not engage with the ring gear 102 immediately, but abuts on the end surface of the ring gear 102 depending on the teeth positions of the pinion 101 and the ring gear 102.

As explained above, the eco-run control microcomputer 16 first drives the solenoid relay 4 through the solenoid relay driver circuit 17, and then outputs the control command to the motor relay driver circuit 18 to cause the motor relay driver circuit 18 to output the drive signal. Like the solenoid relay driver circuit 17, the solenoid relay driver circuit 18 applies the battery voltage VB to the motor relay driving terminal 13 as the drive signal in response to the control command received from the eco-run control microcomputer 16.

The drive signal outputted from the motor relay driver circuit 18 is supplied to the motor relay 70 by way of the motor relay driving terminal 13 to drive the motor relay 70. In more detail, when the drive signal (battery voltage VB) is applied to the relay coil L2 of the second motor relay 6, the second motor relay is turned on to thereby drive the first motor relay 7.

As a consequence, the battery voltage VB is applied to the starter motor 8 and the starter motor 8 starts to rotate. The rotation torque of the starter motor 8 is transmitted to the crankshaft of the engine through the pinion 101 and the ring gear 102 to start the engine.

As explained above, restarting of the engine after being idle-stopped by the idle stop function performed by the eco-run control microcomputer 16 is carried out by individually driving the solenoid relay 4 and the motor relay 70 of the starter 9 by the eco-run control microcomputer 16.

So far, the driving control of the starter 9 in accordance with the idle-stop function performed by the eco-run control microcomputer 16 has been described. However, when the engine is started up normally by the user of the vehicle, the starter 9 is not controlled by the eco-run control microcomputer 16, but instead, the below described engine start operation is performed.

The engine starting apparatus 10 of this embodiment has a characteristic configuration in which restart of the engine after being idle-stopped by the idle stop function performed by the eco-run control microcomputer 16 is carried out by individually driving the solenoid relay 4 and the motor relay 70 of the starter 9 by the eco-run control microcomputer 16, while on the other hand, normal engine start up is performed by other circuit components including a switch circuit 25 as a major component.

To this end, the ECU 11 includes, other than the coo-run microcomputer 16, driver circuits 17 and 18 etc. explained above, the switch circuit 25, a delay circuit 21 and a latch circuit 23. These circuits, which are for performing a normal engine start operation, can operate normally when the battery voltage VB supplied as power supply voltage is above a predetermined voltage (3 V, for example). That is, the switch circuit 25, delay circuit 21 and latch circuit 23 do not operate on the control-use voltage Vcc, and are not controlled by the eco-run microcomputer 16. However, exceptionally, at the time of performing the idle-stop function, the eco-run microcomputer 16 outputs a switch circuit stop signal to the latch circuit 23 to stop the operation of the latch circuit 23.

Accordingly, even if the battery voltage BV drops below 4.5 V and accordingly the control-use voltage falls below 3.9 V, causing the eco-run microcomputer 16 to be reset during the normal engine start operation, at least the latch circuit 23 and the switch circuit 25 can operate normally as long as the battery voltage VB is above or equal to 3 V. The delay circuit 21 includes a general purpose comparator 22 (see FIG. 2) which operates on the battery voltage VB applied as power supply voltage. Accordingly, if the battery voltage VB falls to around 3 V, the operation of the comparator 22 becomes unstable, and as a result, the delay circuit 21 may malfunction. However, in this embodiment, the latch circuit 23 is provided to prevent malfunction of the delay circuit 21 from adversely affecting other components during the normal engine start operation.

The engine starting apparatus 10 of this embodiment further includes the key switch 2 which is turned on by being inserted to a key cylinder and turned to a start position by the user of the vehicle, and the neutral switch 3 configured to be turned on when the gear of the transmission is in the neutral range or parking range. The solenoid relay 4 is applied with the battery voltage VB at its input side through these switches.

The key switch 2 is connected to the positive terminal of the battery 1 at one end thereof, and connected to one end of the neutral switch 3 at the other end thereof. The other end of the neutral switch 3 is connected to the input side of the solenoid relay 4, and to the solenoid relay driving terminal 12 of the ECU 11.

The detailed circuit structures of the switch 25, delay circuit 21 and latch circuit 23 are explained later.

When the key switch 2 is turned on by the user while the neutral switch 3 is on, the battery voltage VB is applied to the solenoid relay 4 through the key switch 2 and the neutral switch 3, causing the solenoid relay 4 to be driven (turned on).

The battery voltage VB applied to the solenoid relay 4 through the key switch 2 and the neutral switch 3 is also supplied to the ECU 11 through the solenoid relay driving terminal 12 to be applied to the switch circuit 25, the delay circuit 21 and the latch circuit 23. Here, the battery voltage VB supplied to the ECU 11 through the key switch 2 and the neutral switch 3 is applied to the circuits 21, 23 and 25 not as power supply voltage but as input signals. As a result, the delay circuit 21 and the latch circuit 23 starts to operate, and the switch circuit 23 is turned on to make electrical connection between the solenoid relay driving terminal 12 and the motor relay driving terminal 13.

The switch circuit 25 is provided between the relays 4 and 70 to make electrical connection between the input side of the solenoid relay 4 (the other end of the relay coil L1) and the input side of the motor relay 70 (the other end of the relay coil L2 of the second motor relay 6).

When the battery voltage VB being applied to the solenoid relay 4 through the key switch 2 and the neutral switch 3 is also applied to the switch circuit 25, delay circuit 21 and latch circuit 23 through the solenoid relay driving terminal 12, the switch circuit 25 turns on after elapse of a certain time period by the operations of the delay circuit 21 and latch circuit 23. When the switch circuit 25 turns on to make electrical connection between the relays 4 and 70 (between the solenoid relay driving terminal 12 and the motor relay driving terminal 13), the battery voltage VB is also applied to the motor relay 70 through the solenoid relay driving terminal 12, switch circuit 25 and motor relay driving terminal 13, to thereby drive the motor relay 70.

As explained above, the engine starting apparatus 1 of this embodiment includes the switch circuit 25, delay circuit 21 and latch circuit 23 in the ECU 11, and configured turn on the switch circuit 25 to make electrical connection between the relays 4 and 70 to thereby apply the battery voltage VB being applied to the solenoid relay 4 to the motor relay 70 through the switch circuit 25 in order to drive the starter 9 to start the engine normally.

After the engine is started up by turning on the switch circuit 25 through the normal engine start operation, when the key switch 2 is turned off by the user, or the neutral switch 3 is turned off, the application of the battery voltage VB to the relays 4 and 70 is interrupted to turn off the relays 4 and 70.

As described in the foregoing, when the eco-run control microcomputer 16 performs the idle stop function to restart the engine, the eco-run control microcomputer 16 outputs the switch circuit stop signal to the latch circuit 23 to forcibly turn off the switch circuit 25.

The reason is that since there may occur a case in which the switch circuit 25 is not turned off quickly and held in the on-state after the engine is started up normally depending on the operating stats of the delay circuit 21 and the latch circuit 23, it is necessary to turn off the switch circuit 25 definitely so that the engine can be restarted without fail after being idle-stopped.

Next, the structures and operations of the switch circuit 25, delay circuit 21 and latch circuit 23 included in the ECU 11 are explained in further detail with reference to FIG. 2.

Figure 2:
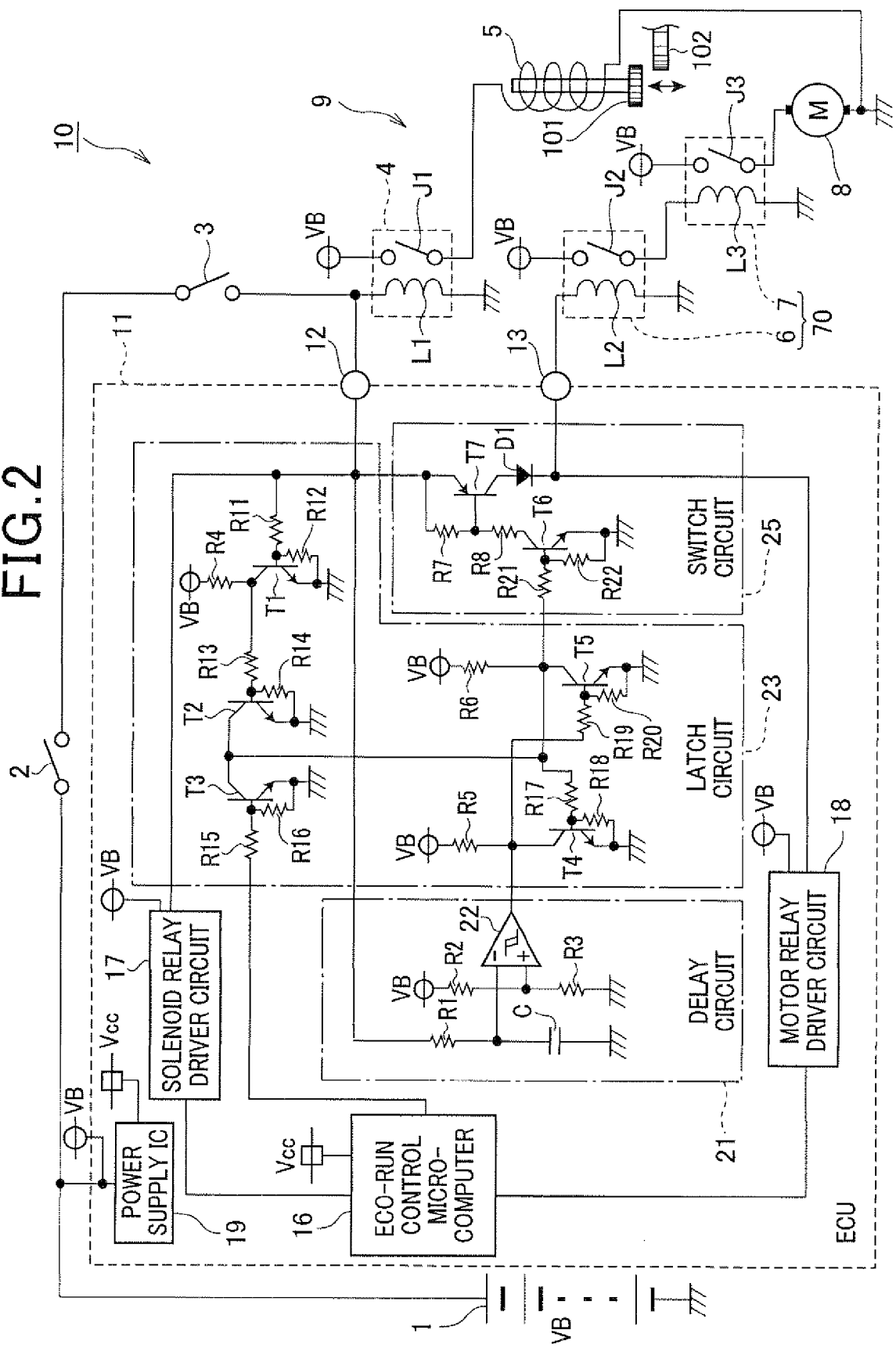
FIG. 2 is a diagram showing the detailed circuit structure of the engine starting apparatus according to the first embodiment of the invention.

As shown in FIG. 2, the delay circuit 21 includes an integrating circuit constituted of a resistor R1 and a capacitor C, a reference voltage generating circuit which generates a reference voltage by dividing the battery voltage VB by use of voltage dividing resistors R2 and R3, and the comparator 22. The output of the integrating circuit is inputted to the negative input terminal of the comparator 22, and the reference voltage is applied to the positive input terminal of the comparator 22. The comparator 22, which operates on the battery voltage VB as power supply voltage, has a hysteresis characteristic. The comparator 22 used in this embodiment is a general-purpose comparator not completely guaranteed to operate normally down to the minimum value of the battery voltage VB, which is assumed to be 3.5 V during the normal engine start operation. Accordingly, the comparator 22 may malfunction during the normal engine start operation if the battery voltage VB drops nearly to 3.5 V. However, since the latch circuit 23 is provided, malfunction of the comparator 22 can be prevented from adversely affecting other components.

When the battery voltage VB is inputted to the delay circuit 21 as an input signal through the solenoid driving terminal 12, the output voltage of the integrating circuit (or the voltage applied to the negative input terminal of the comparator 22) gradually increases up to the battery voltage VB. The slope of this increase depends on the time constant of the integrating circuit determined by the resistance of the resistor R1 and the capacitance of the capacitor C.

When the output voltage of the integrating circuit is 0 V, the output of the comparator 22 is at the high level, and when the output voltage of the integrating circuit exceeds the reference voltage after elapse of a predetermined delay time, the output of the comparator 22 changes to the low level.

The latch circuit 23 is for latching the output of the delay circuit 21 when the level of the output of the delay circuit 21 changes from the high level to the low level.

The latch circuit 23 includes a resistor R6, a first latch transistor T5, a resistor R5 and a second latch transistor T4. The resistor R6 is connected to the output terminal of the latch circuit 23 at one end thereof, and applied with the battery voltage VB at the other end thereof. The first latch transistor T5 is connected to the output terminal of the delay circuit 21 (or the output terminal of the comparator 22) at its base, connected to the ground line at its emitter, and connected to the output terminal of the latch circuit 23 (or the one end of the resistor R6) at its collector. The resistor R5 is connected to the output terminal of the delay circuit 21 at one end thereof, and applied with the battery voltage VB at the other end thereof. The second latch transistor T4 is connected to the output terminal 23 of the latch circuit 23 through a resistor R17 at its base, connected to the ground line at its emitter, and connected to the output terminal of the delay circuit 21 at its collector.

Between the base and emitter of the first latch transistor T5, a bias resistor R20 is connected. Between the base and emitter of the second latch transistor T4, a bias resistor R18 is connected. The transistors T4 and T5 are NPN bipolar transistors.

The switch circuit 25 includes switching transistors T6 and T7. The switching transistor T6 is connected to the output terminal of the latch circuit 23 through a resistor R21 at its base, connected to the ground line at its emitter, and connected to the solenoid relay driving terminal 12 through resistors R8 and R7 at its collector. The switching transistor T7 is connected to the connection node between the resistors R7 and R8 at its base, connected to the solenoid relay driving terminal 12 at its emitter, and connected to the anode of a diode D1 at its collector. The cathode of the diode D1 is connected to the motor relay driving terminal 13.

Between the base and emitter of the switching transistor T6, a bias transistor R22 is connected. The switching transistor T6 is an NPN bipolar transistor, and the switching transistor T7 is a PNP bipolar transistor.

While the output signal of the delay circuit 21 is at the high level, that is, while the battery voltage VB is not supplied to the ECU 11 through the solenoid relay driving terminal 12, since the first latch transistor T5 is on and the second latch transistor T4 is off, the output signal of the latch circuit 23 outputted to the switch circuit 25 is at the low level. As a result, since the switching transistor T6 is off causing the switching transistor T7 to be off, the solenoid relay driving terminal 12 and the motor relay driving terminal 13 are isolated from each other.

On the other hand, when the key switch 2 and the neutral switch 3 are both turned on, and as a result, the battery voltage VB is applied to the delay circuit 21 through the solenoid relay driving terminal 12, since the output voltage of the integrating circuit of the delay circuit 21 gradually increases, the output signal of the comparator 22 changes from the high level to the low level in time.

As a consequence, the first latch transistor T5 of the latch circuit 23 turns off, causing the output signal of the latch circuit to become the high level. Subsequently, the switching transistors T6 and T7 turn on, making electrical connection between the solenoid relay driving terminal 12 and the motor relay driving terminal 13, as a result of which the solenoid relay 4 and the motor relay 70 are electrically connected to each other.

As a consequence, since the battery voltage VB having been applied to the solenoid relay 4 through the key switch 2 and the neutral switch 3 is also applied to the motor relay 70 through the switching transistor T7, diode D1, and motor relay driving terminal 13, the motor relay 70 is driven (turned on).

Further, since the output signal of the latch circuit 23 becomes the high level causing the second latch transistor T4 of the latch circuit 23 to turn on, the base of the first latch transistor T5 is kept at the ground level, and accordingly, the first latch transistor T5 is held in the off state.

Hence, even if the delay circuit 21 malfunctions after the output signal of the delay circuit 21 changed to the low level, causing the output signal thereof to the high level temporarily or intermittently, the output signal of the latch circuit 23 outputted to the switch circuit 25 is held in the high level by the latch action (self-holding action) of the latch circuit 23.

This embodiment further includes a latch enabling transistor T2 in the latch circuit 23 to enable quickly turning off the switching transistor T7 of the switch circuit 25 to thereby quickly stop the starter motor 8 when the key switch 2 is turned off after it was turned on to operate the starter 9.

The latch enabling transistor T2 is connected to one end of a resistor R13 at its base, the other end of the resistor R13 being connected to the collector of an input enabling transistor T1, connected to the ground line at its emitter, and connected to the output terminal of the latch circuit 23 at its collector. The input enabling transistor T1 is connected to the solenoid relay driving terminal 12 through a resistor R11 at its base, connected to the ground line at its emitter, and connected to the other end of the resistor R13 and one end of a resistor R4, the other end of the resistor R4 being applied with the battery voltage VB. These transistors T1 and T2 are NPN bipolar transistors. Between the base and emitter of the transistor T1, a bias resistor R12 is connected. Between the base and emitter of the transistor T2, a bias resistor R14 is connected.

When the battery voltage VB is applied to the solenoid relay driving terminal 12 through the key switch 2 and the neutral switch 3, the input enabling transistor T1 turns on, and the latch enabling transistor T2 turns off. As a result, the delay circuit 21 and the latch circuit 23 operate in the above described ways, and accordingly, the output signal of the latch circuit 23 is held at the high level to turn on the switch circuit 25 (or the switching transistor T7).

Thereafter, when the key switch 2 is turned off, and accordingly, the supply of the battery voltage VB through the key switch 2 and the neutral switch 3 is stopped, the input enabling transistor T1 turns off, and the latch enabling transistor T2 turns on. By the turning on of the latch enabling transistor T2, since the output terminal of the latch circuit 23 is forcibly brought to the low level to release the latch state, the switch circuit 25 is forcibly turned off.

This embodiment further includes a switch circuit stopping transistor T3 in the latch circuit 23 to prevent electrical connection from being made between the solenoid relay driving terminal 12 and the motor relay driving terminal 13 by the switch circuit 25 being erroneously turned on when the eco-run microcomputer 16 performs the engine restart operation.

The switch circuit stopping transistor T3 is connected to the eco-run microcomputer 16 through a resistor R15 at its base, connected to the ground line at its emitter, and connected to the output terminal of the latch circuit 23 at its collector. Between the base and emitter of the switch circuit stopping transistor T3, a bias resistor R16 is connected.

The eco-run control microcomputer 16 does not output any signal to the switch circuit stopping transistor T3 except when it operates to restart the engine having been temporarily stopped by the idle stop function. That is, the eco-run control microcomputer 16 is in the high impedance state when viewed from the base of the switch circuit stopping transistor T3.

On the other hand, when the engine restart operation in accordance with the idle stop function is carried out, the eco-run control microcomputer 16 outputs a switch circuit stop signal at the high level to the switch circuit stopping transistor T3 to turn on the switch circuit stopping transistor T3. As a result, the output terminal of the latch circuit 23 is forcibly brought to the low level to release the latch state, and the off-state of the switch circuit 25 is held forcibly.

The eco-run control microcomputer 16 is configured not to output any signal to the switch circuit stopping transistor T3 while coo-run control microcomputer 16 is not in operation or is in malfunction for any reason. Accordingly, the switch circuit stopping transistor T3 is kept in the off state except when the engine restart operation is carried out in accordance with the idle stop function.

Hence, even if the eco-run control microcomputer 16 malfunctions for any reason, and accordingly the idle stop function cannot operate normally, the engine can be started by the normal engine start operation, that is, by the operation of the key switch 2 by the user of the vehicle.

Incidentally, the various transistors and resistors constituting the delay circuit 21, the latch circuit 23, and the switch circuit 25 are discrete components. Next, the driving of the starter 9 (starting of the engine) is explained with reference to the time charts of FIGS. 3 and 4.

First, the driving of the starter 9 in accordance with the normal engine start operation is explained with reference to the time chart of FIG. 3. As shown in this time chart, when the key switch 2 is turned on by the user while the neutral switch 3 is on, the battery voltage VB is applied to the solenoid relay driving terminal 12 of the ECU 11 through the key switch 2 and neutral switch 3.

As a result, the solenoid relay 4 is turned on. Further, since the ECU 11 is supplied with the battery voltage VB although through the solenoid relay driving terminal 12, the output voltage of the integrating circuit of the delay circuit 21 starts gradually increase. Also, since the latch enabling transistor T2 is turned from off to on, the latch operation of the latch circuit 23 is enabled.

When the output voltage of the integrating circuit of the delay circuit 21 exceeds the reference voltage after elapse of a certain delay time from the time when the battery voltage VB is supplied to the delay circuit 21 as an input signal, the output signal of the comparator 22 changes from the high level to the low level, causing the output signal of the latch circuit 23 to become the high level. As a result, the switching transistor T7 of the switch circuit 25 turns on, and the motor relay 70 is applied with the battery voltage VS through the switching transistor T7 and the motor relay driving terminal 13 to cause the motor relay 70 to turn on.

Incidentally, during the normal engine start operation, since the eco-run control microcomputer 16 does not output any signal to the switch circuit stopping transistor T3, the switch circuit stopping transistor T3 is held in the off state to hold the latch circuit 23 in the latch operation enabled state.

When the motor relay 70 is turned on, the starter motor 8 starts to rotate. During a period immediately after the starter motor 8 starts to rotate, since a large current flows through the starter motor 8, the battery voltage VB drops to a large extent, for example, drops to 3.5 V. When the battery voltage VB drops to around 3.5 V, the eco-run control microcomputer 16 becomes unable to operate normally, and is reset. However, since the eco-run control microcomputer 16 is not involved in the driving of any relay of the starter 9 when the normal engine start operation is performed, the normal engine start operation is not affected by the operating state of the eco-run control microcomputer 16.

Figure 3:
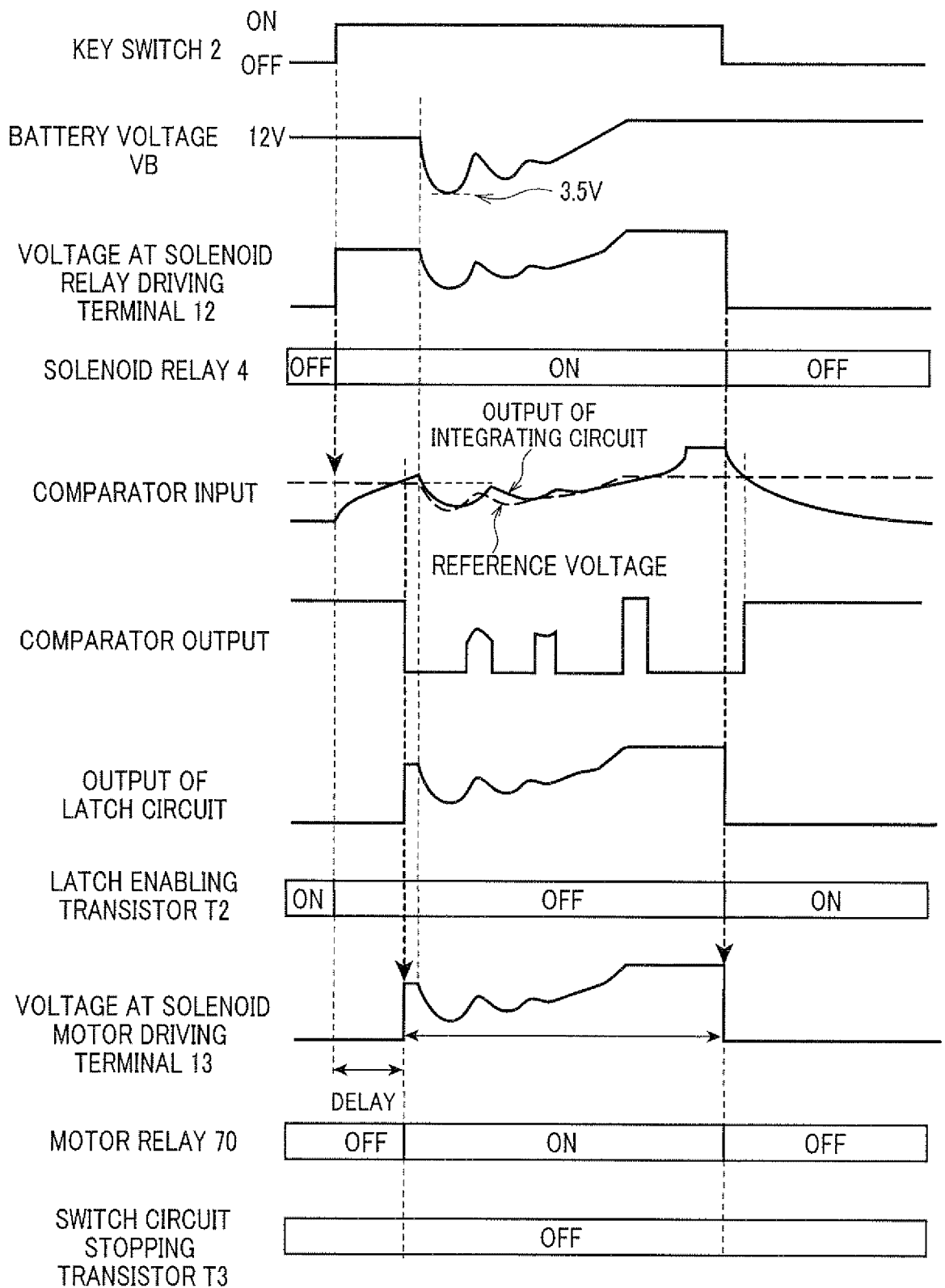
FIG. 3 is a time chart explaining normal engine start operation performed by the engine starting apparatus according to the first embodiment of the invention.

During this period, the battery voltage VB not only drops, but also varies depending on the state of electrical loads of the vehicle including the starter motor 8 as shown in FIG. 3. Accordingly, the voltages applied to the comparator 22 vary depending on the battery voltage VB. The reference voltage applied to the positive input terminal of the comparator 22 vary quickly following the variation of the battery voltage VB, while the output voltage of the integrating circuit applied to the negative input terminal of the comparator 22 varies with a certain delay following the variation of the battery voltage VB.

Because of the variation of the battery voltage VB, variations of the various voltages applied to the comparator 22 due to the variation of the battery voltage VB, and malfunction of the comparator 22 due to the drop of the battery voltage VB, the output signal of the comparator 22 changes intermittently to the high level after it changes to the low level as shown in FIG. 3.

However, even if the output signal of the comparator 22 temporarily changes to the high level, the switching transistor T7 is held in the on state, and the battery voltage VB continues to be applied to the motor relay 70, because the output signal of the latch circuit 23 is held in the high level by the latching operation of the latch circuit 23.

Also the output waveform of the latch circuit 23 varies after the motor relay 70 starts to be driven, due to the variation of the battery voltage VB. However, since the variation of the output waveform of the latch circuit 23 is within the high level range, it does not cause the switching transistor T7 to be turned off.

Thereafter, when the key switch 2 is turned off by the user, since the application of the battery voltage VB to the solenoid relay 4 and the solenoid relay driving terminal 12 through this key switch 2 is stopped, the solenoid relay 4 is turned off. Further at this time, the latch enabling transistor T2 of the latch circuit 23 is turned on. Accordingly, the signal outputted from the latch circuit 23 to the switch circuit 25 is forcibly brought to the low level, causing the switching transistor T7 of the switch circuit 25 to be turned off, and the application of the battery voltage VP to the motor relay 70 through the motor relay driving terminal 13 is stopped. As a consequence, the motor relay 70 is turned off.

However, the output signal of the comparator 22 does not return to the high level quickly when the key switch 2 is turned off, but returns to the high level only after elapse of a certain delay time. The reason is that since the charge charged in the capacitor of the integrating circuit is discharged gradually after the application of the battery voltage VB to the delay circuit 21 is stopped, the voltage applied to the negative input terminal of the comparator 22 does not fall to 0 V quickly.

Figure 4:
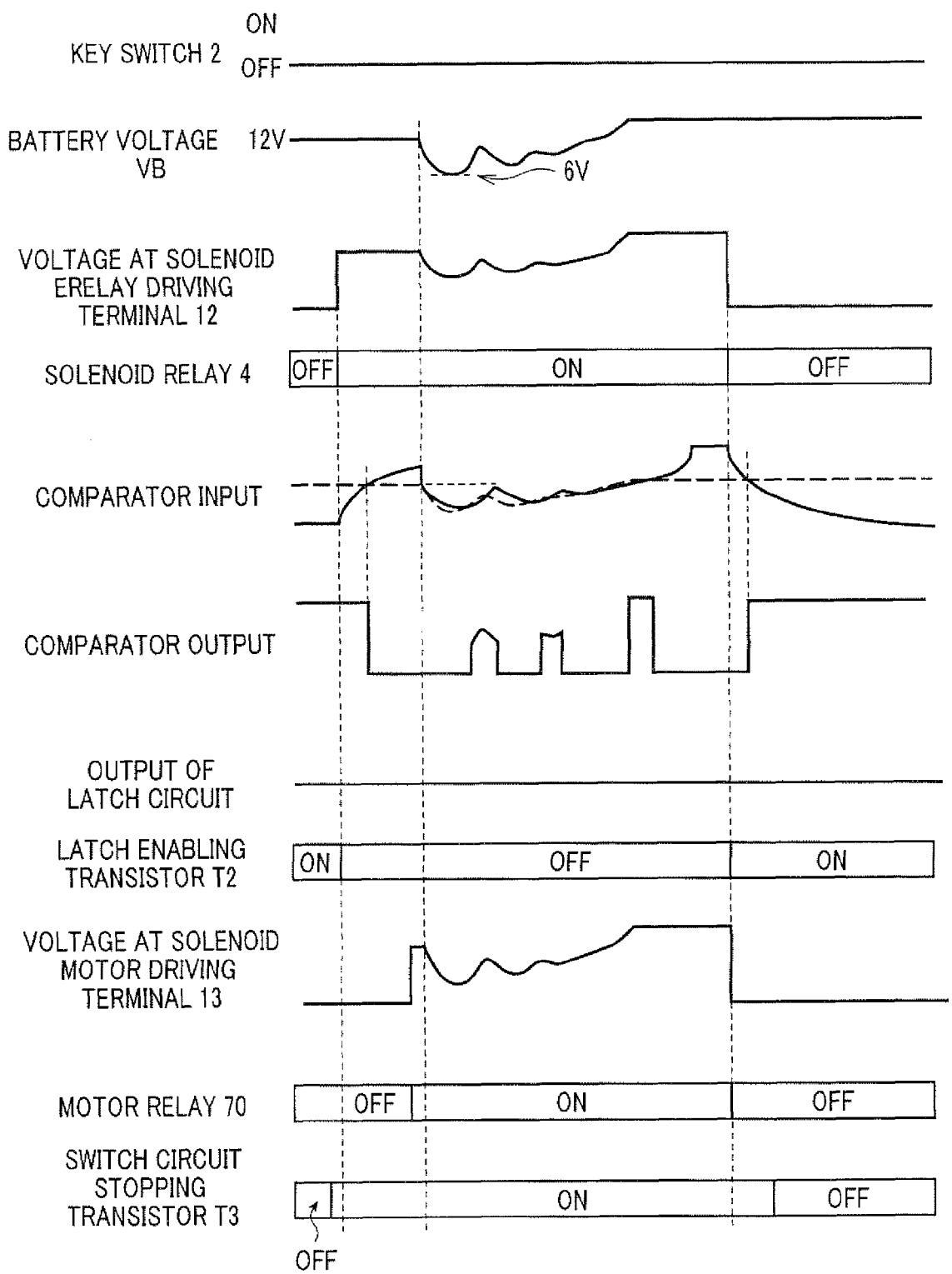
FIG. 4 is a time chart explaining engine restart operation after idle stop performed by the engine starting apparatus according to the first embodiment of the invention.

Next, the driving of the starter 9 in accordance with the engine restart operation after idle stop is explained with reference to the time chart of FIG. 4. The eco-run control microcomputer 16 is not involved in driving the starter 9 when the normal engine start operation is performed as explained above with reference to FIG. 3, however, the eco-run control microcomputer 16 takes a major part in performing the engine restart operation after idle stop as explained below.

In this case, it can be assumed that the key switch 2 is off, because the engine has been already started in accordance with the normal engine start operation. More precisely, it can be assumed that the key switch 2 is in the ignition position and not the start position.

When predetermined conditions to restart the engine are satisfied after the engine was temporarily stopped (idle-stopped), the eco-run control microcomputer 16 causes the solenoid relay driver circuit 17 to output the drive signal (the battery voltage VB). This drive signal is applied to the solenoid relay 4 through the solenoid relay driving terminal 12 to turn on the solenoid relay 4.

This drive signal outputted from the solenoid relay driver circuit 17 is also applied to the delay circuit 21, the latch circuit 23 and the switch circuit 25. Accordingly, since the delay circuit 21 starts to operate, the output signal of the comparator 22 changes to the low level after elapse of a predetermined delay time.

However, when the conditions to restart the engine are satisfied, the eco-run control microcomputer 16 outputs the switch circuit stop command at the high level to the switch circuit stopping transistor T3 of the latch circuit 23 to turn on the switch circuit stopping transistor T3 prior to causing the solenoid relay driver circuit 17 to output the drive signal. Hence, the output signal of the latch circuit 23 is forcibly held in the low level, and the switching transistor T7 of the switch circuit 25 is forcibly held in the off state.

The eco-run control microcomputer 16 drives the solenoid relay 4, and then, after elapse of a predetermined time, controls the motor relay driver circuit 18 to output the drive signal (the battery voltage VB). This derive signal is applied to the motor relay 70 through the motor relay driving terminal 13 to turn on the motor relay 70.

Generally, the torque which the starter motor 8 is required to generate to restart the engine after idle stop is smaller than that necessary to normally start the engine. This is because the temperature of the lubricating oil is low when performing the normal engine start operation, while on the other hand it is high when performing the engine restart operation after idle stop.

Accordingly, when the motor relay 70 is driven to operate the starter motor 8, although the battery voltage VB drops and varies as in the case of performing the normal engine start operation, their degrees are small compared to those in the case of performing the normal engine start operation. For example, the battery voltage VB drops to 3.5 V at lowest during the normal engine start operation. On the other hand, the battery voltage VB drops to only around 6.5 V which is within the operation guaranteed range of the power supply IC 19 during the engine restart operation, and accordingly the power supply IC 19 can generate the control-use voltage of 5 V during the engine restart operation.

As explained above, since the battery voltage VB does not drop to such an extent that the eco-run control microcomputer 16 is reset during the engine restart operation, the eco-run control microcomputer 16 can properly perform the engine restart operation so that the engine can be restarted without fail.

After the engine is restarted, the eco-run control microcomputer 16 causes the driver circuits 17 and 18 to stop outputting the drive signals to turn off the relays 4 and 70 to thereby stop the operation of the starter 9. After elapse of a predetermined time from the time when the relays 4 and 70 are turned off, the eco-run control microcomputer 16 stops outputting the switch circuit stop signal to the switch circuit stopping transistor T3 to turn off the switch circuit stopping transistor T3.

The engine starting apparatus of the first embodiment described above provides the following advantages. When the normal engine start operation is performed, the eco-run control microcomputer 16 is not involved in driving the relays 4 and 70, and instead, electrical connection between the relays 4 and 70 is made through the switch circuit 25 so that the relays 4 and 70 are applied with the battery voltage VB to be turned on. Accordingly, it is unnecessary to take measures, such as providing a voltage step-up circuit for stepping up the battery voltage VB, to prevent the eco-run control microcomputer 16 from being reset due to drop of the battery voltage VB which causes fall of the control-use voltage. This makes it possible to drive the relays 4 and 70 of the starter 9 even when the battery voltage VB drops below the reset voltage, to thereby improve the reliability of the engine restart operation.

To make electrical connection between the solenoid relay 4 and the motor relay 70 by the switch circuit 25, the motor relay 70 is turned on only after elapse of the predetermined delay time of the delay circuit 21 from the time when the solenoid relay 4 is turned on. This makes it possible to reliably start the engine.

Since the latch circuit 23 is provided between the delay circuit 21 and the switch circuit 25, when the switching transistor T7 of the switch circuit 25 is turned on by the signal at the low level outputted from the delay circuit 21 as a conduction permission signal, the on-state of the switching transistor T7 is held irrespective of the variation of the level of the signal outputted from the delay circuit 21. Accordingly, even if the delay circuit 21 malfunctions for any reason, for example, due to drop of the battery voltage VB during starting of the engine, causing the output signal of the delay circuit 21 to change from the low level to the high level temporarily, it is possible to prevent the driving of the motor relay 70 from being interrupted because the low level signal of the latch circuit 23 is being held.

The delay circuit 21 has a simple structure in which the comparator 22 compares the output voltage of the integrating circuit with the reference voltage. In addition, as the comparator 22, a general-purpose comparator can be used, because it is not necessary to guarantee that the comparator 22 operates on the assumed lowest value of the battery voltage VS (3.5 V, for example). Accordingly, the delay circuit 21 can be manufactured at low cost.

Further, the latch circuit 23 is constituted of the discrete transistors and resistors without using a general-purpose latch IC circuit. Accordingly, even if the battery voltage VB increases sharply due to load dump, or when a jump start in which the same two batteries 1 are connected in series to start the engine is made, it is possible to prevent the latch circuit 23 from being damaged.

The latch circuit 23 includes the latch enabling transistor T2. When the key switch 2 is turned off after the key switch 2 and the neutral switch 3 are turned on by the latch enabling transistor T2 to drive the starter 9 to perform the normal engine start operation, since the output signal of the latch circuit 23 is forcibly brought to the low level, it is possible to turn off the transistor T7 of the switch circuit 25 quickly to turn off the motor relay 70 without delay.

The high side of the latch circuit 23 which is applied with the battery voltage VB and passes a current therefrom is constituted of only the resistors R5 and R6, unlike the low side of the latch circuit 23 constituted of the transistors T4 and T5. Accordingly, it is easy to bring the output voltage (the collector voltage) of each transistor of the low side to the ground level when it is turned on. This ensures reliable latching and unlatching operations of the latch circuit 23. In addition, as the transistors T4 and T5 of the low side of the latch circuit 23, inexpensive transistors of low driving power can be used.

On the electrical path between the key switch 2 and the solenoid relay 4, the neutral switch 3 is provided so that the battery voltage VB coming through the key switch 2 is supplied to the ECU 11 from the downstream side of the neutral switch 3. Accordingly, if the key switch 2 sticks to "ON", the user can stop the engine starting operation by changing the gear of the transmission to any range other than the neutral range and the parking range to thereby turn off the neutral switch 3.

The engine starting apparatus 10 of this embodiment can start the engine reliably even when the battery voltage VS drops to such a large extent to disable the eco-run control microcomputer 16 from operating during the normal engine start operation. After the engine is started up, the idle stop function is implemented by the eco-run control microcomputer 16. That is, this embodiment realizes both the reliable normal engine start operation, and energy saving by the idle stop function performed after the engine is started up normally.

The eco-run control microcomputer 16 is configured to output the switch circuit stop signal at the high level to the switch circuit stopping transistor T3 of the latch circuit 23 to forcibly turn off the switching transistor T7 of the switch circuit 25 when the engine restart operation is performed. Accordingly, although also the delay circuit 21 starts to operate by the drive signal outputted from the solenoid relay driver circuit 17, it is possible to hold the switching transistor T7 in the off-state irrespective of the operation of the delay circuit 21 in order to restart the engine without fail.

Second Embodiment

Figure 5:
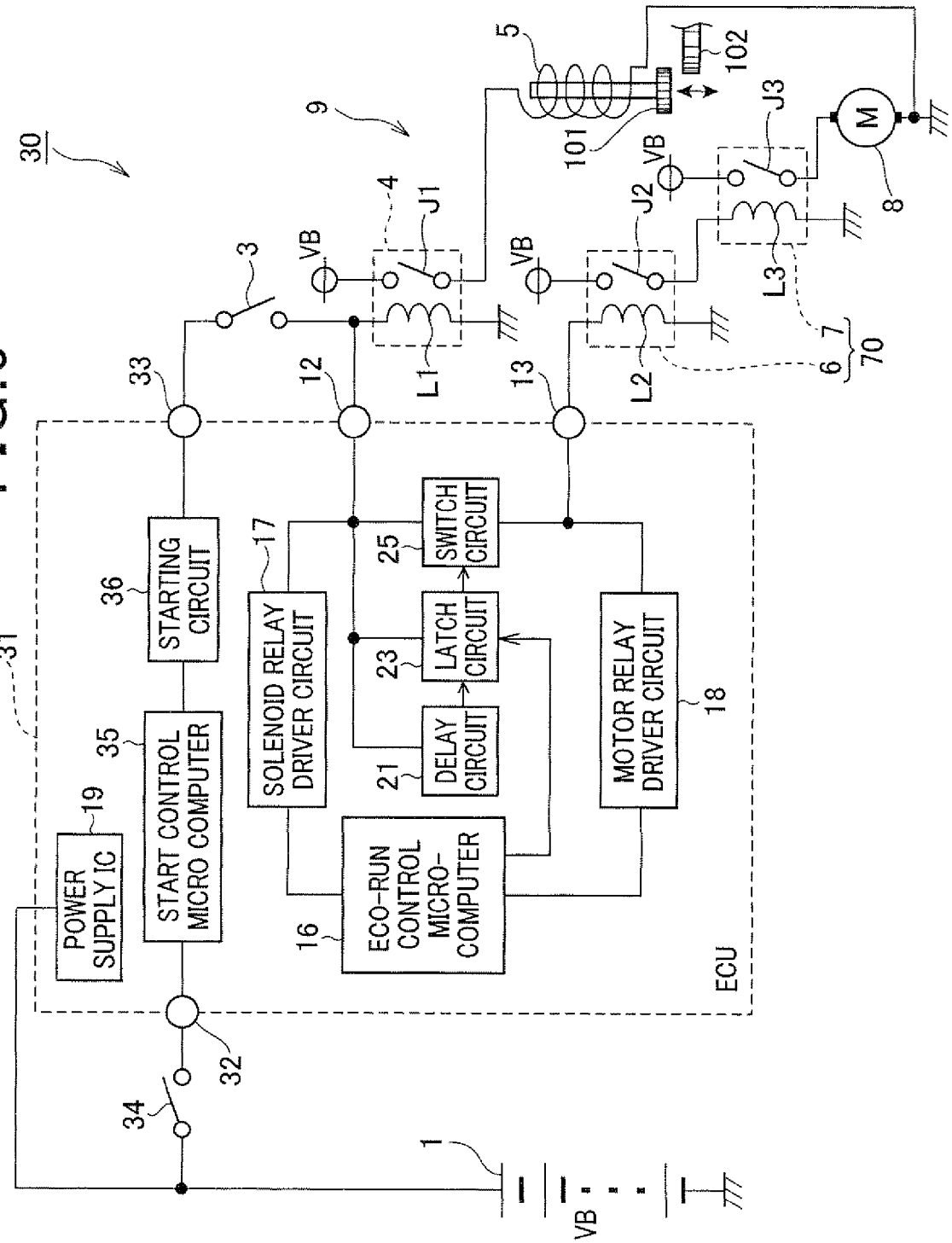
FIG. 5 is a block diagram schematically showing the structure of an engine starting apparatus according to a second embodiment of the invention.

Next, an engine starting apparatus 30 according to a second embodiment of the invention is described with reference to FIG. 5. In FIG. 5, the reference numerals and characters identical to those in FIG. 1 represent the same elements.

As shown in FIG. 5, the engine starting apparatus 30 includes a push switch 34 which is operated by the user of the vehicle to start the engine. This push switch 34 is connected to a push switch signal input terminal 32 of an ECU 31.

The ECU 31 includes a start control microcomputer 35, a starting circuit 36, and a start signal output terminal 33. The start control microcomputer 35 controls the starting circuit 36 depending on the operation state of the push switch 34 to output a start signal to the solenoid relay 4 through the start signal output terminal 33.

The engine starting apparatus 30, which is able to implement the so-called push start system, is configured such that when the push switch 34 is pushed on while the user presses the brake pedal (and further the user presses the clutch lever in the case of manual transmission), the start control microcomputer 35 controls the starting circuit 36 to output the start signal to drive the solenoid relay 4.

The starting circuit 36 is configured to output the battery voltage VB being supplied to the ECU 31 to the start signal output terminal 33 as the start signal. The start signal outputted to the solenoid relay 4 from the starting circuit 36 when the push switch 34 is pushed on is also inputted to the ECU 31 through the solenoid relay driving terminal 12. Accordingly, as in the first embodiment, the delay circuit 21, the latch circuit 23 and the switch circuit 25 start to operate by being applied with the start signal (the battery voltage VB), and as a result, the switching transistor T7 of the switch circuit 25 turns on to make electrical connection between the terminals 12 and 13 to turn on the solenoid relay 4 and also the motor relay 70.

Accordingly, according to the engine starting apparatus 30 of this embodiment, it is possible to implement the push start system in which the relays 4 and 70 can be driven to start the engine without using the eco-run control microcomputer 16.

Further, according to the engine starting apparatus 30 of this embodiment providing the push start system which enables to start the engine by operating the push switch 34, it is possible to constitute the ECU 11 with substantially the same major circuit components (the eco-run control microcomputer 16, delay circuit 21, latch circuit 23 and switch circuit 25) for both a vehicle provided with the push start system and a vehicle provided with the engine starting apparatus of the first embodiment including the key switch 2 which is operated to start the engine.

In the engine starting apparatus 30 of this embodiment, the starting circuit 36 which outputs the start signal to drive the relays 4 and 70 when the normal engine start operation is performed is disposed on the upstream side (on the battery 1 side) of the supplying path of the battery voltage VB with respect to the neutral switch 3 as in the engine starting apparatus 10 of the first embodiment. This configuration makes it possible for the user to shift the gear of the transmission to any range other than the neutral range and the parking range in order to stop engine starting operation, when the starting circuit 26 malfunctions and keeps outputting the start signal. Therefore, since it is not necessary to provide the starting circuit 36 with an appropriate malfunction detection circuit, the starting circuit 36 can be made simple in structure.

Third Embodiment

Figure 6:
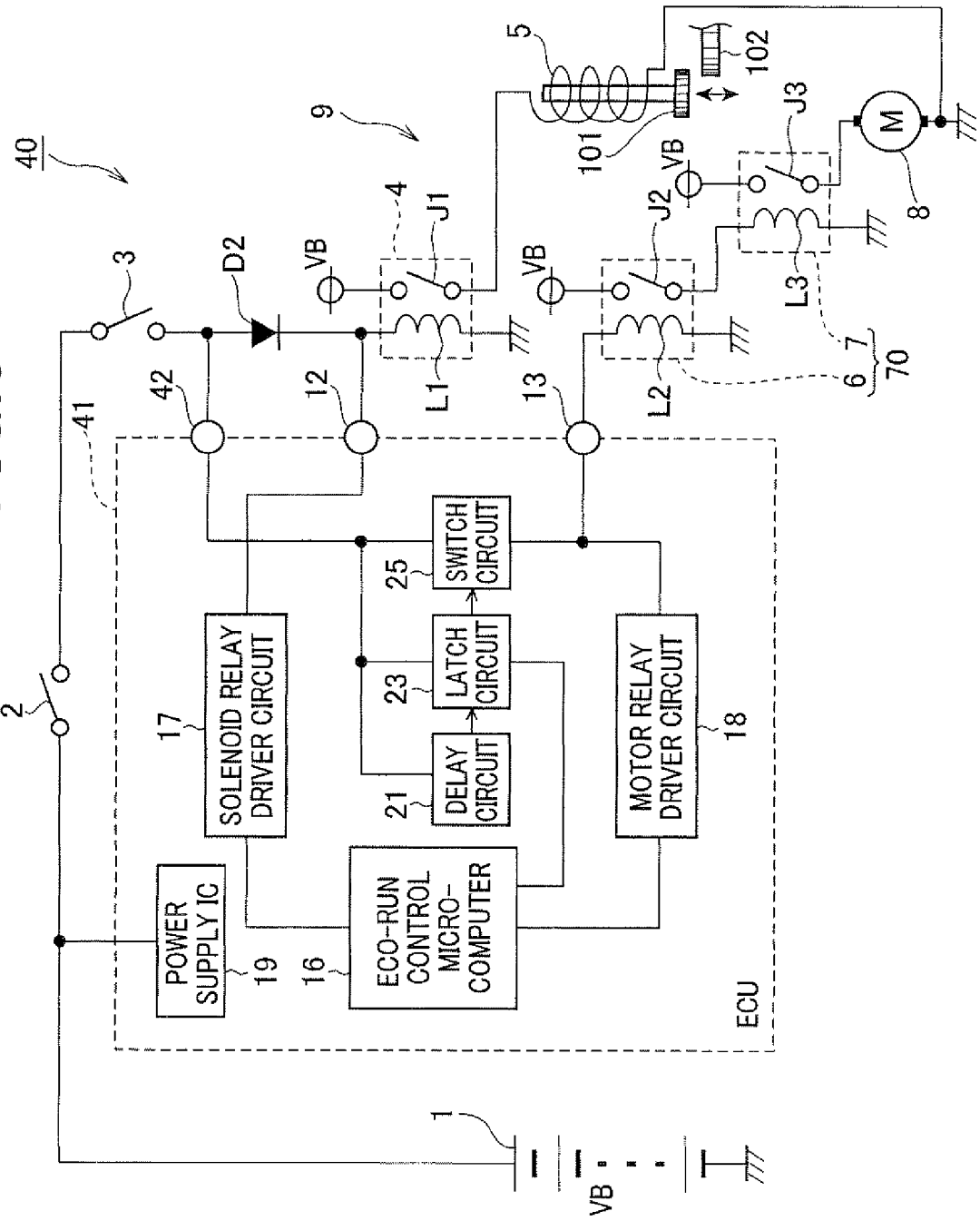
FIG. 6 is a block diagram schematically showing the structure of an engine starting apparatus according to a third embodiment of the invention.

Next, an engine starting apparatus 40 according to a third embodiment of the invention is described with reference to FIG. 6. In FIG. 6, the reference numerals and characters identical to those in FIG. 1 represent the same elements.

As shown in FIG. 6, in this embodiment, a diode D2 is provided between the neutral switch 3 and the solenoid relay 4. In more detail, the diode D2 is connected to the neutral switch 3 and a battery voltage input terminal 42 of an ECU 41 at its anode, and connected to the solenoid relay 4 and the solenoid relay driving terminal 12 of the ECU 41 at its cathode.

The ECU 41 has a structure similar to that of the ECU 11 of the first embodiment. However, the ECU 41 differs from the ECU 11 in the following points. In the ECU 41 of this embodiment, the solenoid relay driving terminal 12 is not connected to any of the switch circuit 25, delay circuit 21 and latch circuit 23. Accordingly, the drive signal outputted from the solenoid relay driver circuit 17 is not applied to any of the switch circuit 25, delay circuit 21 and latch circuit 23.

On the other hand, the battery voltage VB is applied to the switch circuit 25, delay circuit 21 and latch circuit 23 through the battery voltage input terminal 42.

Accordingly, in this embodiment, when the switches 2 and 3 are turned on, the battery voltage VB is applied to the solenoid relay 4, and also applied to the switch circuit 25, delay circuit 21 and latch circuit 23 of the ECU 41 to drive the starter 9 to thereby start the engine as in the first embodiment.

Further, when the eco-run control microcomputer 16 drives the relays 4 and 70 during the engine restart operation after idle stop, the eco-run control microcomputer 16 operates in the same way as that in the first embodiment except that it does not output the switch circuit stop signal to the latch circuit 23. Accordingly, in this embodiment, the latch circuit 23 does not include the switch circuit stopping circuit T3.

This is because the drive signal outputted form the solenoid relay driver circuit 17 is applied to the side of the cathode of the diode D2, and the battery voltage VB is applied from the side of the cathode of the diode D2 to the switch circuit 25, delay circuit 21 and latch circuit 23 separately from the drive signal outputted form the solenoid relay driver circuit 17.

This structure makes it possible that when the drive signal is outputted from the solenoid relay driver circuit 17 during the engine restart operation after idle stop, the diode D2 prevents this drive signal from being inputted to the switch circuit 25, delay circuit 21 and latch circuit 23. Accordingly, unlike the first embodiment, it is not necessary for the eco-run control microcomputer 16 to output the switch circuit stop signal to forcibly turn off the switch circuit 25.

Hence, according to the engine starting apparatus 40 of this embodiment, it is possible to prevent the drive signals outputted respectively from the driver circuits 17 and 18 to drive the relays 4 and 70 from being inputted to the switch circuit 25, delay circuit 21 and latch circuit 23 causing the switch circuit 25 to turn on. Accordingly, the relays 4 and 70 can be driven by the eco-run control microcomputer 16 without being affected by the switch circuit 25.

It is a matter of course that various modifications can be made to the above described embodiments as described below.

As shown in FIG. 7, an engine starting apparatus 50 of the invention may include a discharge transistor T10 for forcibly and rapidly discharging the charge charged in the capacitor C of the delay circuit 21 included in its ECU 51. The engine starting apparatus 50 shown in FIG. 7 has the same structure as the engine starting apparatus 10 of the first embodiment except for this discharge transistor T10.

In the engine starting apparatus 50, the discharge transistor T10 is off while applied with the battery voltage VB outputted from the solenoid relay driver terminal 12 after the key switch 2 and the neutral switch 3 are turned on. During this period, the capacitor C is charged. When the key switch 2 is turned off after the engine is started up, the discharge transistor T10 is turned on. As a result, the charge in the capacitor C is forcibly and rapidly discharged to the ground through the discharge transistor T10.

Accordingly, since the charge in the capacitor C is rapidly discharged each time the key switch 2 is turned off, it is possible to prevent occurrence of a situation in which the key switch 2 is turned on soon after it is turned off and before the charge in the capacitor C is discharged completely, causing the delay time of the delay circuit 21 to become shorter.

Although each embodiment described above has two relays (the solenoid relay 4 and motor relay 70, to be precise, the motor relay 70 including the relays 6 and 7) as starter components which operate individually, the starter may include three or more relays which operate individually.

For example, in a case where the starter includes first, second and third relays, the switch circuit 25 may be provided between the first and second relays and also between the second and third relays so that the battery voltage VB applied to the first relay is applied to the second and third relays in succession.

Each of the relays of the starter which operate individually may be parallel-connected with another relay. For example, in a case where the switch circuit 25 is provided between first and second relays which operate individually, the second or first relay may be parallel-connected with another relay.

Further, in a case where three or more relays are provided in the starter, the switch circuit 25 may be provided not between each adjacent two of the relays, but between specific two of the relays adjacent to each other.

The above explained preferred embodiments are exemplary of the invention of the present application which is described solely by the claims appended below. It should be understood that modifications of the preferred embodiments may be made as would occur to one of skill in the art.

What is claimed is:

1. An engine starting apparatus comprising:
 a microcomputer that operates on a control-use voltage generated by stepping down a battery voltage of a vehicle battery, and is configured to output a drive signal individually to first and second relays of a starter of said vehicle engine to drive said first and second relays to thereby cause said starter to operate when predetermined engine start conditions are satisfied, and to be reset when said control-use voltage decreases below a predetermined reset voltage; and
 an inter-relay switch configured to make electrical connection between said first and second relays when said first relay is applied with said battery voltage, said second relay being applied with said battery voltage when said electrical connection is made;
 said first relay being configured to be applied with said battery voltage when a manual start switch is operated.

2. The engine starting apparatus according to claim 1, further comprising a delay circuit configured to output a connection permission signal after elapse of a predetermined delay time from a time when said battery voltage is applied to said first relay, said inter-relay switch being configured to make said electrical connection upon receiving said connection permission signal from said delay circuit.

3. The engine starting apparatus according to claim 2, wherein said delay circuit is constituted of an integrating circuit and a comparator,
 said integrating circuit including a reference voltage generating circuit generating a reference voltage, a series connection of a resistor and a capacitor, said integrating circuit being applied with said battery voltage through a connection node between said resistor and said capacitor when said first relay is applied with said battery voltage to output a voltage gradually increasing up to said battery voltage at a slope depending on a time constant determined by a resistance of said resistor and a capacitance of said capacitor,
 said comparator outputting said connection permission signal when said voltage outputted from said integrating circuit becomes higher than said reference voltage.

4. The engine starting apparatus according to claim 3, wherein said inter-relay switch includes a discharge circuit configured to forcibly discharge charge in said capacitor when application of said battery voltage to said delay circuit is stopped.

5. The engine starting apparatus according to claim 2, wherein said inter-relay switch includes a latch circuit for latching said connection permission signal outputted from said delay circuit.

6. The engine starting apparatus according to claim 5, wherein said latch circuit is constituted of discrete transistors and discrete resistors.

7. The engine starting apparatus according to claim 5, wherein said inter-relay switch includes a first disconnection section configured to release latch of said connection permission signal by said latch circuit to thereby cause said inter-relay switch to break said electrical connection when application of said battery voltage to said delay circuit is stopped.

8. The engine starting apparatus according to claim 5, wherein said delay circuit is configured to output a low-level voltage signal as said connection permission signal, and said latch circuit includes first and second resistors, and first and second transistors, said first resistor being connected to an output terminal of said latch circuit at one end thereof and applied with said control-use voltage, said first transistor being connected to an output terminal of said delay circuit at a base thereof, grounded at an emitter thereof, and connected to said output terminal of said latch circuit at a collector thereof, said second resistor being connected to said output terminal of said delay circuit at one end thereof, and applied with said control-use voltage at the other end thereof, said second transistor being connected to said output terminal of said latch circuit at a base thereof, grounded at an emitter thereof, and connected to said output terminal of said delay circuit at a collector thereof;

said first transistor being held in an off-state irrespective of variation of output level of said delay circuit after said delay circuit outputs said low-level voltage signal as said connection permission signal, causing said first transistor to turn off, causing said output signal of said latch circuit to become a high-level voltage signal, and causing said second transistor to turn on, said inter-relay switch being configured to make said electrical connection while said latch circuit outputs said high-level voltage signal.

9. The engine starting apparatus according to claim 1, wherein said vehicle is provided with an interlock switch configured to be turned on when a gear of a transmission of said vehicle is switched to a specific range of said transmission, said battery voltage being applied to said first relay through said manual start switch through said interlock switch.

10. The engine starting apparatus according to claim 1, further comprising an engine stop section configured to temporarily stop said engine when predetermined engine stop conditions are satisfied, said microcomputer being configured to drive said first and second relays to restart said engine being temporarily stopped when predetermined engine restart conditions are satisfied.

11. The engine starting apparatus according to claim 10, further comprising a second disconnection section configured to cause said inter-relay switch to break said electrical connection in response to a disconnection command outputted from said microcomputer, said microcomputer being configured to output said disconnection command to said second disconnection section to restart said engine temporarily stopped by said engine stop function.

12. The engine starting apparatus according to claim 11, wherein said microcomputer is configured not to output said disconnection command when said microcomputer malfunctions.

13. The engine starting apparatus according to claim 1, wherein said first relay is applied with said battery voltage through a diode connected to an input side of said first relay at a cathode thereof, and said inter-relay section is applied with said battery voltage from an anode side of said diode, said drive signal outputted from said microcomputer being inputted to said first relay through said cathode of said diode.

14. The engine starting apparatus according to claim 1, wherein said second relay is constituted of a motor relay and a torque transmission relay, said motor relay being configured to be driven to apply said battery voltage to a starter motor of said starter to cause said starter motor to operate, said torque transmission relay being configured to be driven to cause a torque transmission mechanism of said vehicle to operate so that torque generated by said starter motor is transmitted to said engine.

* * * * *